United States Patent [19]

Hirashima

[11] 4,383,304
[45] May 10, 1983

[54] PROGRAMMABLE BIT SHIFT CIRCUIT

[75] Inventor: Kunihiko Hirashima, Kofu, Japan

[73] Assignee: Pioneer Electronic Corporation, Tokyo, Japan

[21] Appl. No.: 194,659

[22] Filed: Oct. 6, 1980

[30] Foreign Application Priority Data

Oct. 5, 1979 [JP] Japan .................. 54-128583

[51] Int. Cl.³ .................................... G06F 7/00
[52] U.S. Cl. ............................ 364/715; 364/900
[58] Field of Search ............ 364/715, 757, 716, 900; 307/452

[56] References Cited

U.S. PATENT DOCUMENTS

| | | | |
|---|---|---|---|
| 3,076,181 | 1/1963 | Newhouse et al. | 364/900 X |
| 3,818,203 | 6/1974 | Perlowski et al. | 364/716 |
| 3,887,799 | 6/1975 | Lindgren | 364/900 X |
| 3,961,750 | 6/1976 | Dao | 364/715 |
| 3,989,955 | 11/1976 | Suzuki | 307/452 |
| 4,051,358 | 9/1977 | Schwartz | 364/716 |

OTHER PUBLICATIONS

Gersbach, "Algebraic/Logical Shift Matrix", IBM Tech. Disclosure Bulletin, vol. 23, No. 1, Jun. 1980, pp. 120-122.

Gersbach, "High-Speed Shifter Array", IBM Tech. Disclosure Bulletin, vol. 21, No. 4, Sep. 1978, pp. 1379-1380.

Primary Examiner—David H. Malzahn
Attorney, Agent, or Firm—Sughrue, Mion, Zinn, Macpeak, and Seas

[57] ABSTRACT

A programmable bit shift circuit in which data can be shifted in one operation by as many bit positions as desired, m input data lines and n output data lines are provided intersecting each other with $n > m$. Switching elements such as transmission gates are provided at intersections of the input and output data lines. The control electrodes of switching elements at the intersections of the first through m—th input data lines and the j—th through $(j+m-1)$—th output data lines for each integer value of j equal to or less than $(n-m+1)$ are interconnected. Shift control signals are coupled to the interconnected control electrodes.

4 Claims, 3 Drawing Figures

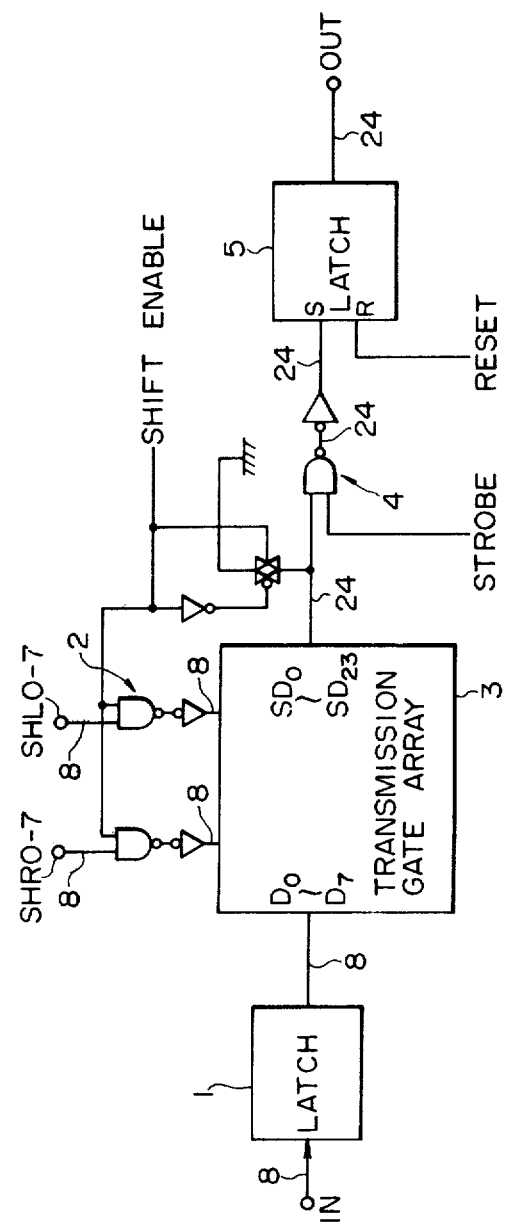

PROGRAMMABLE BIT SHIFT CIRCUIT

BACKGROUND OF THE INVENTION

The present invention relates to bit shift circuits and more particularly to a programmable bit shift circuit.

Bit shift circuits are often used in electronic computers or the like for processing binary-coded multi-bit data in accordance with predetermined programs. An example of a conventional bit shift circuit of this general type is as shown in FIG. 1. In this circuit, the input bit signals $D_i$ (where i is a positive integer) of multi-bit data to be shifted are applied to the corresponding set input terminals S of R-S flip-flop circuits $FF_i$ which are latch circuits. The outputs Q of the R-S flip-flop circuits $FF_1$ are applied in predetermined logic combinations to logic gate circuits $L_{i+1}$ and $L_{1-1}$. For instance, the logic gate circuit $L_n$ is composed of a two-input NAND gate $G_1$ receiving the output Q of the flip-flop circuit $FF_{n+1}$ and a right shift signal SHR, a two-input NAND gate $G_2$ receiving the output Q of the flip-flop circuit $FF_{n-1}$ and a left shift signal SHL, and a two-input NAND gate $G_3$ receiving the outputs of the NAND gates $G_1$ and $G_2$. The other logic circuits have the same arrangement as the logic gate circuit $L_n$.

The output of the NAND gate $G_3$ in the logic gate circuit $L_i$ is applied to one input terminal of a two-input NAND gate $NG_i$ to the other input terminal of which a strobe signal is applied. The output of the NAND gate $NG_i$ is applied through an inverter buffer $I_i$ to the set input terminal S of a flip-flop circuit $FF'_i$. The outputs Q of the flip-flop circuits $FF'_i$ form the bit-shifted data $SD_i$.

In the above-described circuit, the output data $SD_i$ provided in response to the input data $D_i$ can be represented by the following logical expression:

$$SD_i = \overline{\overline{(D_{i-1}\cdot SHL)}\cdot \overline{(D_{i+1}\cdot SHR)}} \quad (1)$$

$$= D_{i-1}\cdot SHL + D_{i+1}\cdot SHR,$$

where SHL and SHR are the left shift signal and the right shift signal, respectively. When the signals SHL and SHR are at "1", they represent left and right shift instructions, respectively. Accordingly, as is apparent from the expression (1), in the bit circuit of FIG. 1, the input data can be shifted to either the right or the left by one bit position. However, it is impossible to shift the data by plural bits with a single right or left shift instruction. Therefore, the above-described circuit is disadvantageous in that data multiplication takes a relatively long time.

In order to eliminate this disadvantage, a circuit has been proposed in which multi-bit shift circuits such as a two-bit shift circuit $(SD_i = D_{i-2}\cdot SHL_2 + D_{i+2}\cdot SHR_2)$ and a four-bit shift circuit $(SD_i = D_{i-4}\cdot SHL_4 + D_{i+4}\cdot SHR_4)$ are implemented separately in hardware and the two circuits then combined to carry out, for instance, a six-bit shift operation to thereby reduce the total time required. However, that technique is still disadvantageous in that the hardware itself is considerably intricate and accordingly an integrated circuit implementing such a circuit has a large chip area.

In another conventional circuit, a shift register is employed for subjecting data to bit shifting. This circuit can be implemented quite simply in hardware. However, the circuit is still disadvantageous in that it is difficult to process input data at high speed because the shifting operation can be carried out only at the rate of one bit per clock pulse.

Accordingly, an object of the present invention is to provide a programmable bit shift circuit in which data can be instantaneously shifted by as many bits as desired.

SUMMARY OF THE INVENTION

In accordance with this and other objects of the invention, a bit shift circuit is provided in which m input data lines and n output data lines are arranged intersecting one another (m and n being natural numbers and with m<n), switching elements are provided at the intersections of the input and output data lines so as to electrically couple these data lines, and the control electrodes of the switching elements which are coupled at the intersections of the first through m-th input data lines and the j-th through (j+m−1)-th output data lines (j being a natural number equal to or smaller than n−m+1) are commonly connected by control lines so that input data can be shifted as many bits as desired by selectively driving a desired one of the control lines.

BRIEF DESCRIPTION OF THE DRAWINGS

FIG. 3 is a block diagram for a description of a multiplication operation which is carried out with the circuit shown in FIG. 2.

DESCRIPTION OF THE PREFERRED EMBODIMENTS

The present invention will be described with reference to FIGS. 2 and 3.

Figure 1:
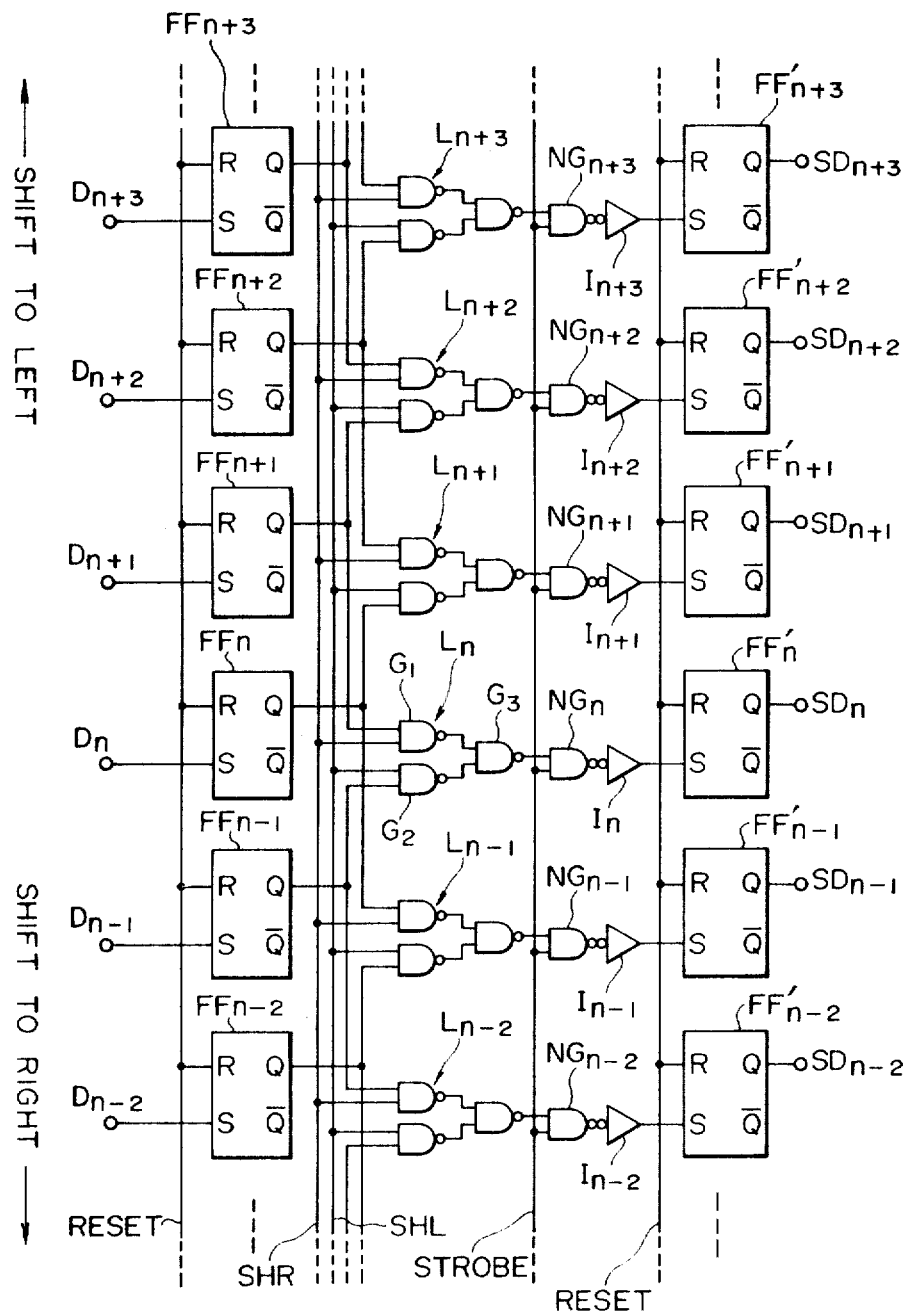
FIG. 1 is a circuit diagram, partly as a block diagram, showing an example of a conventional bit shift circuit.
Figure 2:
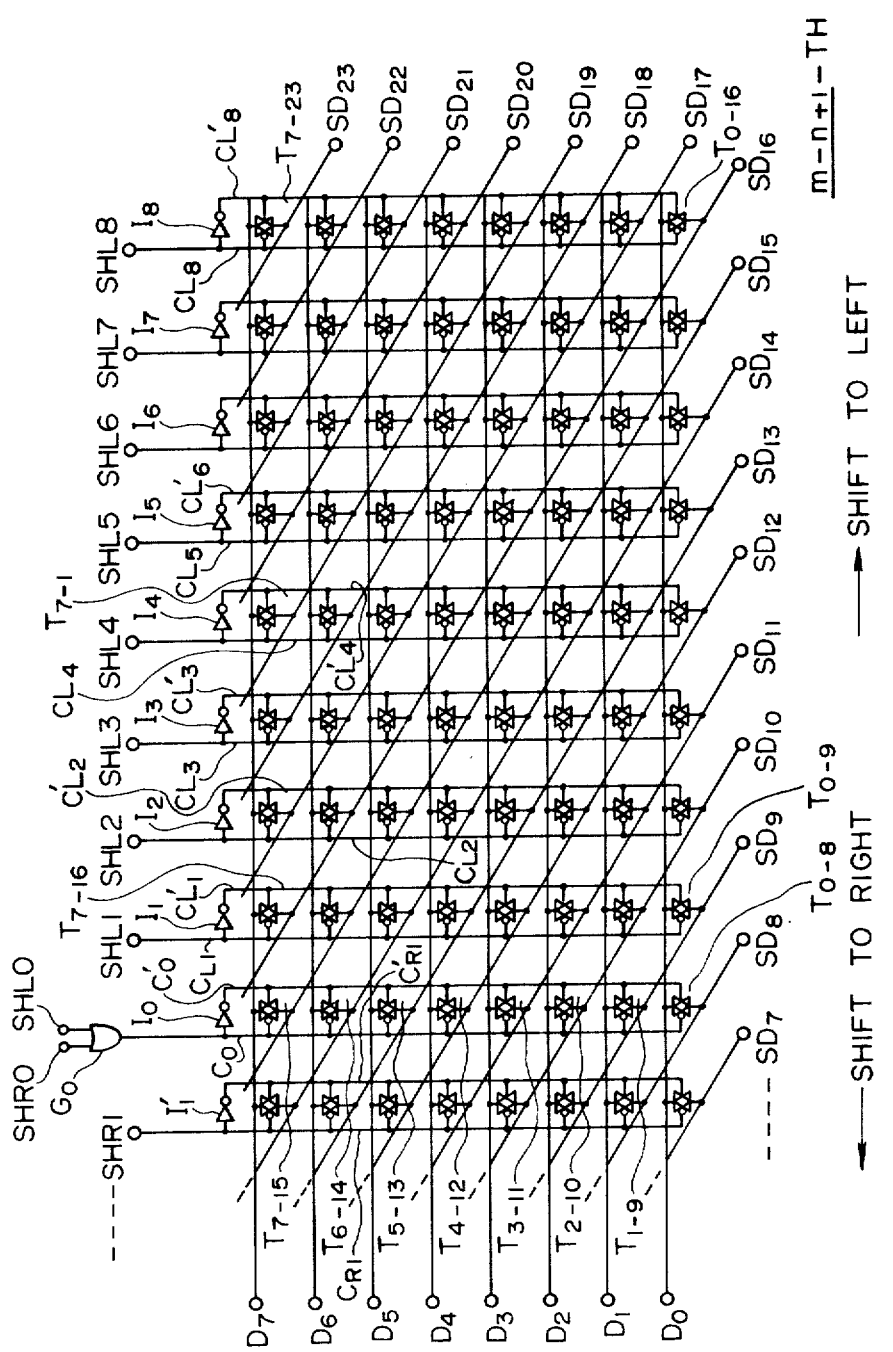
FIG. 2 is a circuit diagram, partly as a block diagram, of a preferred embodiment of a programmable bit shift circuit according to the invention.

FIG. 2 is a circuit diagram of a preferred embodiment of a programmable bit shift circuit according to the invention in which eight-bit input data can be shifted either to the right or the left by from one to eight bits.

Eight input data lines $D_0$ through $D_7$ and twenty-four output data lines $SD_0$ through $SD_{23}$ are arranged with the former crossing the latter. At each cross point or intersection, a C-MOS type transmission gate $T_{i,j}$ is provided for selectively coupling the i-th input data line $D_i$ to the j-th output data line $SD_j$. The control electrode of eight transmission gates arranged at the intersections of the first through eighth input data lines $D_0$ through $D_7$ and the j-th through (j+7)-th output data lines are connected to common control lines so that the transmission gates are simultaneously operated.

For instance in the case of j=9, the paired control electrodes of eight transmission gates $T_{0-8}$, $T_{1-9}$, $T_{2-10}$, $T_{3-11}$, ... $T_{6-14}$ and $T_{5-15}$ arranged at the intersections of the first through eighth data input lines $D_0$ through $D_7$ and the ninth through sixteenth output data lines $SD_8$ through $SD_{15}$ are connected to a pair of control lines CD and C'O. The output (regular phase output) of an OR gate $G_0$ receiving zero shift signals SHLO and SHRO is applied directly to the control CO and is further applied through an inverter $I_0$ as an inverted phase output to the control line C'O.

The arrangement in the cases of j=1 through j=8 and j=10 through j=24 are the same as that described above. In the case of j=10, the eight transmission gates coupled at the intersections of the first through eighth input data lines $D_0$ through $D_7$ and the tenth through seventeenth output data lines $SD_9$ through $SD_{16}$ are connected to a pair of common control lines $CL_1$ and $CL'_1$. An instruction signal $SHL_1$ indicative of a single bit shift to the left is applied directly to the control line $CL_1$ and through an inverter to the control line $CL'_1$. In the case of $j=11$, the eight transmission gates coupled at the intersections of the input data lines $D_0$ through $D_7$ and the eleventh through eighteenth output data lines $SD_{10}$ through $SD_{17}$ are connected to a pair of common control lines $CL_2$ and $CL'_2$. An instruction signal $SHL_2$ indicative of two bits shift to the left is applied directly to the control line $CL_2$ and through an inverter to the control line $CL'_2$. The arrangements for the cases of $J=12, 13, 14, 15, 16$ and $17 (=n-m+1)$ are similar to those described above. It is evident that it is not always necessary that the arrangements for the cases $j=18, 19, 20, \ldots$ and 24 be the same as that described above.

In the case of $j=8$, the eight transmission gates coupled at the intersections of the input data lines $D_0$ through $D_7$ and the eighth through fifteenth output data lines $SD_7$ through $SD_{14}$ are connected to a pair of common control lines $CR_1$ and $CR'_1$. As instruction signal $SHR_1$ indicative of a single bit shift to the right is applied directly to the control line $CR_1$ and through an inverter to the control line $CR'_1$. In the case of $j=7$, the eight transmission gates coupled at the intersections of the input data lines $D_0$ through $D_7$ and the seventh through fourteenth output data lines $SD_6$ through $SD_{13}$ are connected to a pair of common control lines $CR_2$ and $CR'_2$. An instruction signal $SHR_2$ indicative of two bits shift to the right is applied to the control line $CR_2$ and through an inverter to the control line $CR'_2$. The arrangements in the cases of $j=6, 5, 4$ and so forth are similar to those described above.

It is assumed that, in the circuit thus described that the control signal SHLO is at "1" and the other signals are all at "0". In this case, the eight transmission gates $T_{0-8}, T_{1-9}, T_{2-10}, T_{3-11}, T_{4-12}, T_{5-13}, T_{6-14}$ and $T_{7-15}$ are rendered conductive while the remaining transmission gates are rendered non-conductive. Accordingly, the input data $D_0$ through $D_7$ is introduced to the output data lines $SD_8$ through $SD_{15}$ without change. In the case also where only the control signal SHRO is at "1", the outputs are provided similarly as in the above-described case. This state will be referred to as "a zero right and left shift state". In the case where only the control signal $SHL_1$ is at "1", the transmission gates $T_{0-9}, T_{1-10}, T_{2-11}, T_{3-12}, T_{4-13}, T_{5-14}, T_{6-15}$ and $T_{7-16}$ are rendered conductive. Therefore, the input data $D_0$ through $D_7$ is introduced to the output data lines $SD_9$ through $SD_{16}$ without change as a result of which a single bit left shift is effected. Similarly to the above-described case, two bits shift to the left, three bits shift to the left, four bits shift to the left and so forth can be effected instantaneously by raising the levels of the control signals $SHL_2, SHL_3, SHL_4$ and so forth to "1", respectively. Similarly, a single bit shift to the right, two bits shift to the right and so forth can be effected by raising the levels of the control signals $SHR_1, SHR_2$ and so forth, respectively.

Multiplication with the bit shift circuit including the transmission gate array as shown in FIG. 2 will be described with reference to FIG. 3. During an initial period $t_1$, multiplication data IN applied via a data bus is loaded into a latch circuit 1 and, during the following period $t_2$, a shift enable signal is raised to "1" so that, among the multiplier data $SHL_0$ through $SHL_7$, the data $SHL_7$ is supplied through a gate circuit 2 to a transmission gate array 3. If, in this case, the signal $SHL_7$ is at "1", the multiplication data left-shifted by seven bits is provided as the output data of the gate array 3. At the end of the period $t_2$, a strobe signal is raised to "1" in response to which the output data is applied through an output gate circuit 4 to a latch circuit 5 and is stored in the latch circuit 5. If the $SHL_7$ is at "0", all the output data lines $SD_0$ through $SD_{23}$ from the gate array 3 are at "0" and the data is transferred to the latch circuit 5.

During the next period $t_3$, the data $SHL_6$ is supplied to the gate array. At the end of the period $t_3$, the strobe signal is raised to "1" and the data is transferred to the output latch circuit 5 while the data provided during the period $t_3$ is added to the data obtained in the preceding period $t_2$ in an addition circuit (not shown) connected to the latch circuit 5. During the next period $t_4$, the data $SHL_5$ is applied to the gate array 3 and at the end of the period $t_4$ the strobe signal is raised to "1" to transfer the data as described above so that the shifted data obtained during the period $t_4$ is added to the addition results of the data obtained in the preceding period $t_3$. Similarly to the above-described cases, the data is processed until completion of the processing of the data $SHL_0$ in the period $t_9$ has been accomplished. The addition result obtained at the end of the period $t_9$ is the desired multiplication result. This data is supplied to the data bus in the final period $t_{10}$ to achieve the multiplication in one machine cycle. In order to execute each multiplication operation, the conventional circuit requires about ten to thirty machine cycles. Accordingly, the operational speed of the bit shift circuit using the transmission gate array circuit according to the invention is about ten times as fast as that of the conventional circuit.

In the above-described example, C-MOS type transmission gates are employed as the switching elements so that the circuit impedance is considerably small in operation and the degree of integration is improved. However, it goes without saying that other switching elements may be employed.

In the example shown in FIG. 2, output data lines are provided for 24 bits so that eight-bit input data can be shifted to the right or left by as much as eight bits. Therefore, in the case of shifting the eight-bit input data left maximally, that is, by eight bits, the bits of the eight-bit input data are provided on the output data lines $SD_{16}$ through $SD_{23}$, respectively, and with no further shifting. Accordingly, it is unnecessary for the output line $SD_{17}$ to cross the input line $D_0$ and it is unnecessary for the output line $SD_{18}$ to cross the input lines $D_0$ and $D_1$. The last output line $SD_{23}$ crosses the input line $D_7$ only with the result that the degree of integration is improved. It is evident that this same technique can be applicable to the case also where the data is shifted to the right.

In the above-described embodiment, the bit shift circuit is of an eight-bit arrangement. However, the invention is not limited thereto or thereby. In addition, the bit shift circuit can be so freely designed so that the data can be shifted to the right or left by as many bits as required.

What is claimed is:

1. A programmable bit shift circuit for shifting an input multi-bit binary number selectively either leftwardly or rightwardly in a single step, comprising:

m input data lines;

n output data lines, where n is at least m+2;

k control lines, where k is at least 3 and is equal to a total number of possible bit position shifts in both leftward and rightward directions plus 1; and k·m switching elements arranged in a k-by-m rectangular array, each of said input data lines being connected to inputs of each of said switching elements in a corresponding row of said array, each of said control lines being connected to control electrodes of each of said switching elements in a corresponding column of said array, and each of said output lines being connected to outputs of said switching elements along a corresponding diagonal line of said array;

wherein said input data is shifted by a selected predetermined number of bit positions in a desired one of leftward and rightward directions by activating a selected one of said control lines corresponding to said selected predetermined number of bit positions and said desired one of leftward and rightward directions with a delay determined entirely by a delay time of a single one of said switching elements.

2. The bit shift circuit of claim 1 wherein each of said switching elements comprises a C-MOS transmission gate.

3. The bit shift circuit of either of claims 2 and 1 further comprising an OR gate for combining signals representing zero left and right shifts, said OR gate having an output connected to a predetermined one of said control lines corresponding to a zero shift.

4. The bit shift circuit of claim 2 wherein each said control line comprises a normal control line and an inverted control line, said normal control line being connected to a first control input of the corresponding transmission gates and said inverted control line being connected to a second inverted control input of said transmission gates.

* * * * *